United States Patent
Robertson et al.

(10) Patent No.: US 8,934,406 B2
(45) Date of Patent: Jan. 13, 2015

(54) MOBILE WIRELESS COMMUNICATIONS DEVICE TO RECEIVE ADVERTISING MESSAGES BASED UPON KEYWORDS IN VOICE COMMUNICATIONS AND RELATED METHODS

(75) Inventors: Ian Robertson, Waterloo (CA); Martyn Mallick, Baden (CA)

(73) Assignee: BlackBerry Limited, Waterloo, Ontario (CA)

( * ) Notice: Subject to any disclaimer, the term of this patent is extended or adjusted under 35 U.S.C. 154(b) by 541 days.

(21) Appl. No.: 12/394,793

(22) Filed: Feb. 27, 2009

(65) Prior Publication Data

US 2010/0222035 A1 Sep. 2, 2010

(51) Int. Cl.
  *H04M 3/42* (2006.01)
  *H04M 3/487* (2006.01)
  *G06Q 30/02* (2012.01)

(52) U.S. Cl.
  CPC .............. *H04M 3/4878* (2013.01); *G06Q 30/02* (2013.01); *G06Q 30/0267* (2013.01); *H04M 2201/18* (2013.01); *H04M 2201/40* (2013.01)
  USPC ........................................................ 370/328

(58) Field of Classification Search
  CPC .... H04M 2/561; H04Q 11/0428; H04W 4/06; H04W 84/18; H04W 84/12
  USPC ............... 370/270, 312, 328; 704/260, 270.1, 704/275; 705/14; 455/412, 414, 466, 517, 455/563, 411, 457
  See application file for complete search history.

(56) References Cited

U.S. PATENT DOCUMENTS

| | | | | |
|---|---|---|---|---|
| 5,987,424 A * | 11/1999 | Nakamura | ................ | 705/14.39 |
| 6,931,255 B2 * | 8/2005 | Mekuria | ....................... | 455/466 |
| 2001/0032193 A1 * | 10/2001 | Ferber | ............................ | 705/79 |
| 2002/0002461 A1 * | 1/2002 | Tetsumoto | ................ | 704/270.1 |
| 2002/0022476 A1 * | 2/2002 | Go | .................................. | 455/414 |
| 2006/0173915 A1 | 8/2006 | Kliger | ........................ | 707/104.1 |
| 2007/0005368 A1 * | 1/2007 | Chutorash et al. | ............ | 704/275 |
| 2007/0011009 A1 * | 1/2007 | Nurminen et al. | ............ | 704/260 |
| 2007/0201636 A1 | 8/2007 | Gilbert et al. | .............. | 379/88.14 |

(Continued)

FOREIGN PATENT DOCUMENTS

| | | |
|---|---|---|
| CN | 101247247 | 8/2008 |
| WO | 0035216 | 6/2000 |

OTHER PUBLICATIONS http://puggingmedia.com/news/press_releases/pr20070924.html, "Pudding Media leads to free calling by delivering fun entertaining and valuable information and offers," Pudding Media, Sep. 24, 2007.

(Continued)

*Primary Examiner* — Andrew Lai
*Assistant Examiner* — Zhiren Qin
(74) *Attorney, Agent, or Firm* — Allen, Dyer, Doppelt, Milbrath & Gilchrist, P.A.

(57) ABSTRACT

A communications system may include an advertising server for sending advertisement messages based upon keywords. The communications system may further include at least one mobile wireless communications device having a processor cooperating with at least one audio transducer and a wireless transceiver for recognizing keywords in voice communications. The processor may cooperate with the advertising server to receive advertisement messages therefrom based upon the keywords.

20 Claims, 6 Drawing Sheets

(56) References Cited

U.S. PATENT DOCUMENTS

| | | | | |
|---|---|---|---|---|
| 2007/0249406 A1 | 10/2007 | Andreasson | | 455/563 |
| 2008/0115163 A1 | 5/2008 | Gilboa et al. | | 725/34 |
| 2008/0170676 A1 | 7/2008 | Douma et al. | | 379/114.13 |
| 2009/0043660 A1* | 2/2009 | Lee | | 705/14 |
| 2009/0216616 A1* | 8/2009 | Wang et al. | | 705/10 |

OTHER PUBLICATIONS http://www.voip-news.com/feature/top-25-2007-innovations-121707/, "The Top 25 VoIP Innovations of 200," Robert Poe, Dec. 17, 2007.

http://www.nytimes.com/2007/09/24/business/medica/24adcol.html? r=3&oref=slogin&oref=slogin, "Company Will Monitor Phone Calls to Tailor Ads," Loiuse Story, Sep. 24, 2007.

http://www.informationweek.com/news/internet/ebusiness/showArticle.jhtml?articleID=202101023, "Startup Offers Free Calls in Exchange for Eavesdropping," Thomas Clabrun, Sep. 24, 2007.

http://www/blinkx.com/article/blinkx-launches-adhoc-first-contextual-online-video-advertising~409, "Blinkx Launches Adhoc, the First Contextual Online Video Advertising Platform," blinkx, Jun. 25, 2007.

http://trak.in/tags/business/2008/02/11/microsoft-contextual-advertising-content-delivery-solutions/, "Microsoft unveils next generation contextual advertising delivery through speech recognition technology," Arun Prabhudesai, Feb. 11, 2008.

* cited by examiner

MOBILE WIRELESS COMMUNICATIONS DEVICE TO RECEIVE ADVERTISING MESSAGES BASED UPON KEYWORDS IN VOICE COMMUNICATIONS AND RELATED METHODS

TECHNICAL FIELD

The present disclosure relates to the field of advertising and, more particularly, to the delivery of advertising messages to mobile wireless communications devices and related methods.

BACKGROUND

The pervasiveness of electronic communication and, in particular, mobile wireless communication, has led to a desire for the delivery of advertising to mobile wireless communications devices. In some applications, mobile advertising on such mobile wireless communications devices may be similar to more traditional advertising venues, such as television, radio, and print. For example, a mobile wireless communications device that has the capability of displaying video to a user may display a pre-recorded advertisement to the user. Indeed, a television commercial may even be displayed to the user. Similarly, a mobile wireless communications device may play a pre-recorded audio advertisement (such as a radio ad) to a user prior to the user making a telephone call.

There are, however, some fundamental differences between traditional advertising venues and mobile wireless communications devices. For example, most television programs cater to a specific demographic (e.g. males aged 18-35) and advertising displayed during those programs can be directed to products or services that may be desirable to those in that demographic. Differently, mobile wireless communications devices are used by members of many demographics.

Accordingly, it would be useful for mobile wireless communications devices to be able to choose which products or services to advertise when the demographic of the recipient is unknown and deliver advertisements to those users who may be most interested in purchasing the goods and/or services being advertised.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout.

A communications system may include an advertising server for sending advertisement messages based upon keywords and at least one mobile wireless communications device. The at least one mobile wireless communications device may include at least one audio transducer, a wireless transceiver, and a processor. The processor may cooperate with the at least one audio transducer and the wireless transceiver for recognizing keywords in voice communications, and may cooperate with the advertising server to receive advertisement messages therefrom based upon the keywords.

The at least one mobile wireless communications device may further include a display and the processor may visually present received advertisement messages on the display. Additionally or alternatively, the processor may audibly present received advertisement messages via the at least one audio transducer.

The processor may present a given received advertising message during an associated voice communication. Additionally or alternatively, the at least one mobile wireless communications device may further include a memory cooperating with the processor for storing received advertisement messages and the processor may present a given stored received advertising message after an associated voice communication.

The at least one mobile wireless communications device may further include at least one input device cooperating with the processor to permit user selection of presentation of a given received advertising message. The advertising server may further cooperate with the at least one mobile wireless communications device to generate an advertisement message history. Furthermore, the advertising server may selectively send a given advertisement message based upon an associated advertisement message history.

A method aspect is directed to a method of operating communications system. The method may include sending, with an advertising server, advertisement messages based upon keywords to at least one mobile wireless communications device. The method may further include recognizing, with the at least one mobile wireless communications device, keywords in voice communications, and cooperating with the advertising server to receive advertisement messages therefrom based upon the keywords.

Another method aspect is directed to a method of using at least one mobile wireless communications device operable based upon payment of a wireless network user subscription fee to receive advertisement messages based upon keywords from an advertising server. The method may include recognizing keywords in voice communications, and cooperating with the advertising server to receive the advertisement messages therefrom based upon the keywords. The method may also include presenting the advertisement messages for a discount of the wireless network user subscription fee.

Yet another aspect is directed to a computer readable medium to store computer executable modules for execution by a processor of a mobile wireless communications device operable based upon payment of a wireless network user subscription fee. The computer executable modules may include a computer executable advertising module for recognizing keywords in voice communications, and cooperating with an advertising server to receive advertisement messages based upon keywords therefrom. A computer executable presentation module may be for presenting the advertisement messages for a discount of the wireless network user subscription fee.

Figure 1:
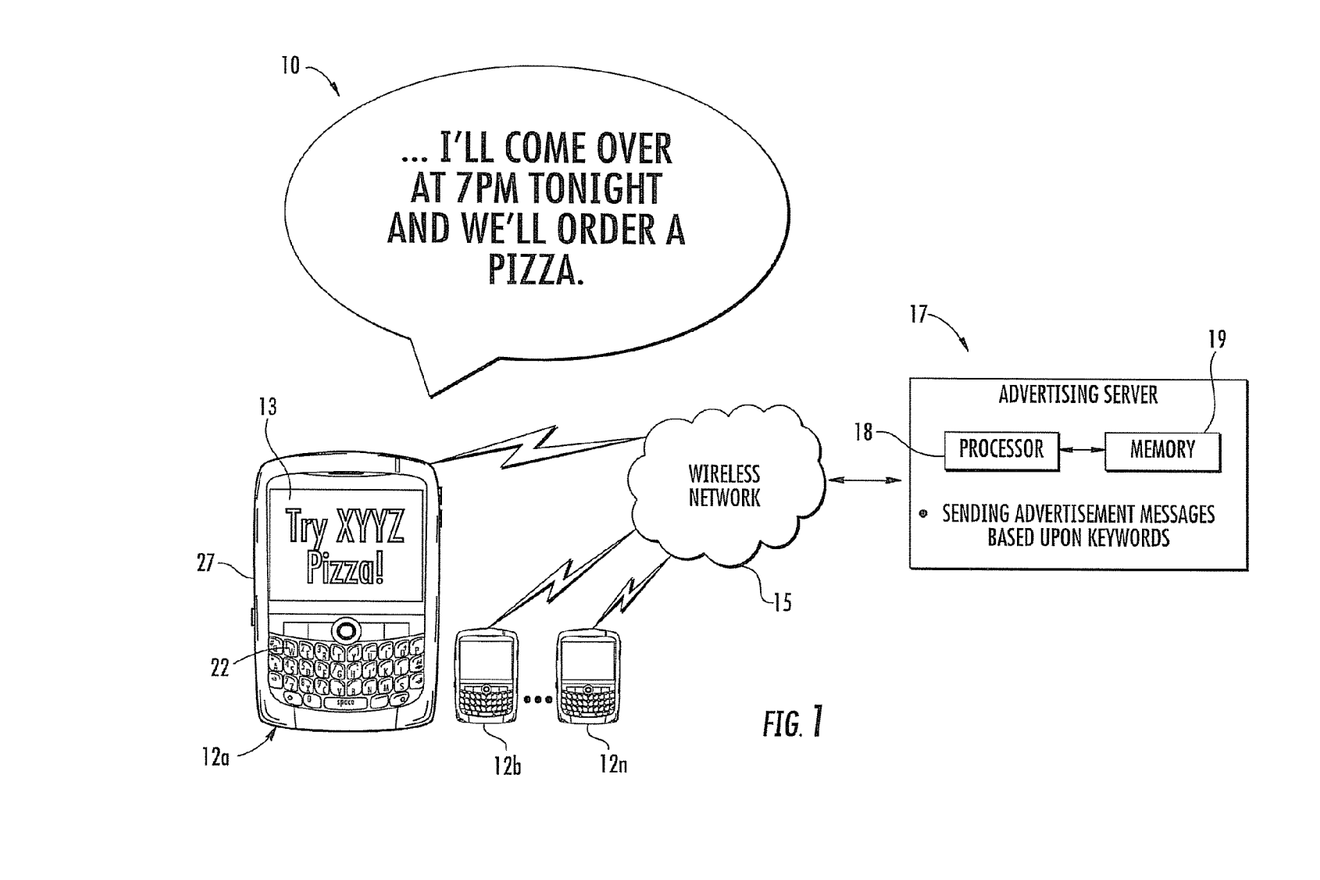
FIG. 1 is a block diagram of a communications system in accordance with an example embodiment of the present disclosure.
Figure 2A:
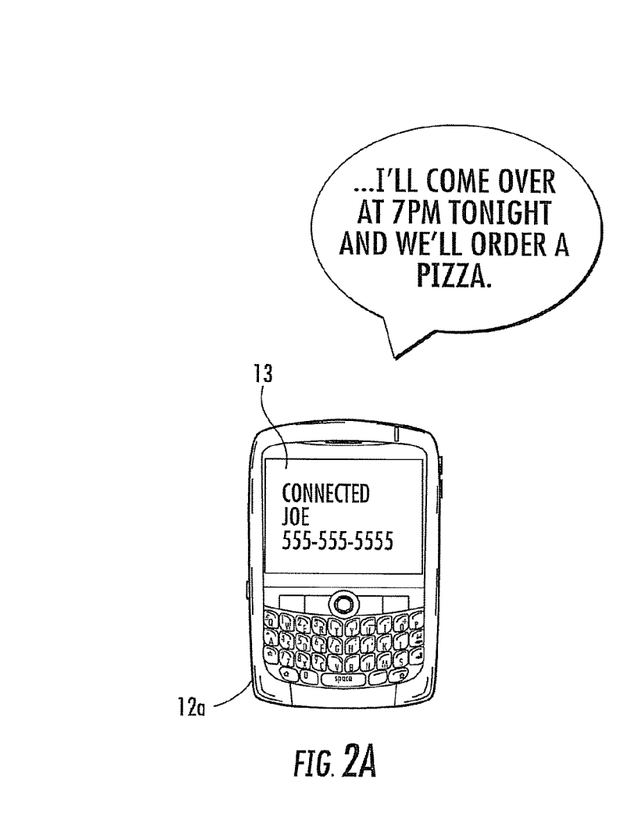
FIG. 2A shows the mobile wireless communications device of FIG. 1 performing a voice communication, according to an example embodiment.
Figure 2B:
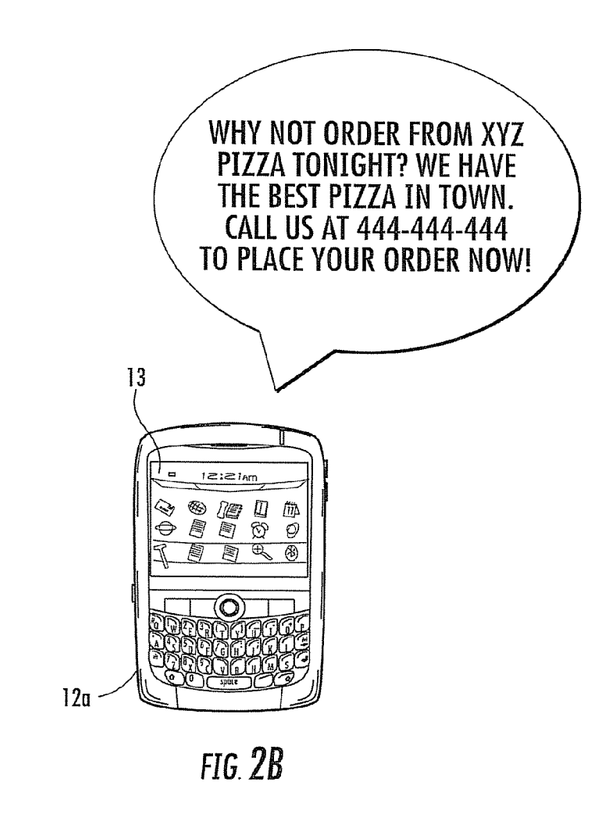
FIG. 2B shows the mobile wireless communications device of FIG. 1 presenting an advertisement message after the voice communication, according to an example embodiment.
Figure 3:
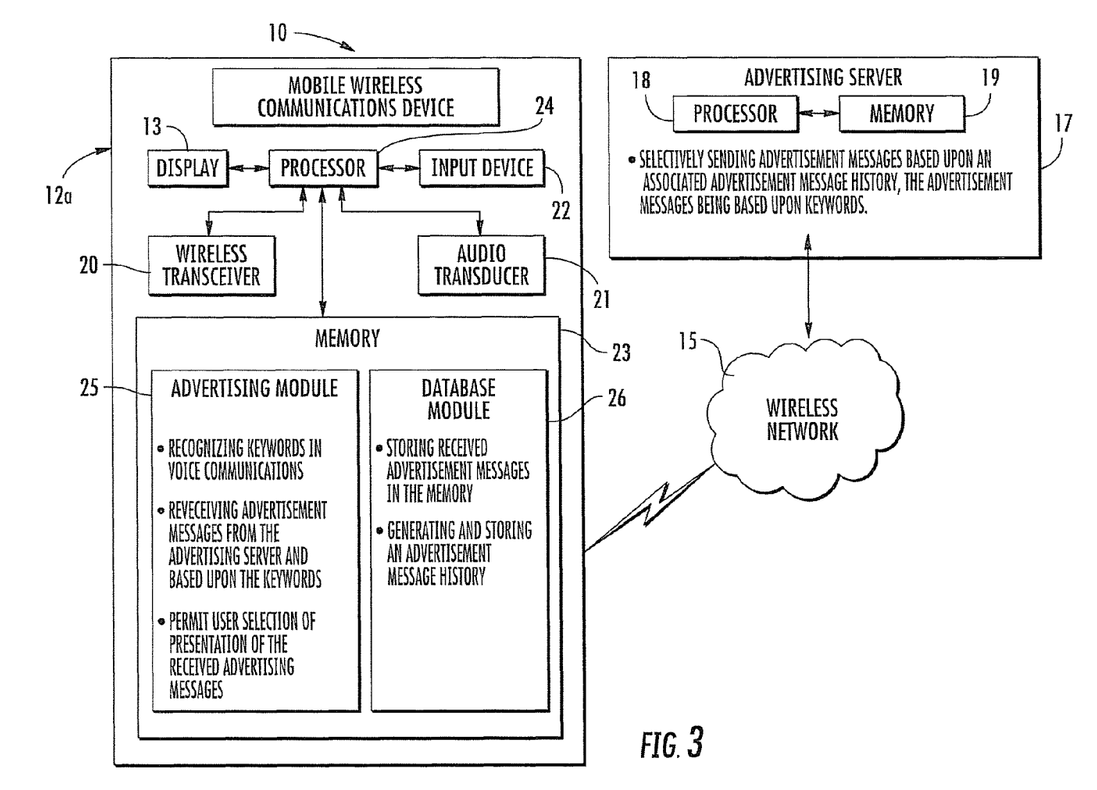
FIG. 3 is a more detailed block diagram of the communications system of FIG. 1, according to an example embodiment.

With reference to FIGS. 1-3, a communications system 10 is now described. The communications system 10 includes a plurality of mobile wireless communications devices 12a-12n for performing voice communications. The mobile wireless communications devices 12a-12n may each include a processor 24 coupled to a display 13, a memory 23, a wireless transceiver 20, an audio transducer 21, and an input device 22. The input device 22 is illustratively a keyboard, for example. Of course, the display 13 may be a touch sensitive screen and may therefore also serve as the input device 22. In addition, the mobile wireless communications devices 12a-12n may include a portable housing 27 and a rechargeable battery (not shown).

The plurality of mobile wireless communications devices 12a-12n may communicate with the wireless network 15 based upon a wireless network user subscription fee. For example, the wireless network 15 may be a cellular network and the plurality of mobile wireless communications devices 12a-12n may be operable to communicate therewith through the purchase of a cellular network access plan. Of course, the plurality of mobile wireless communications devices 12a-12n need not communicate with the wireless network 15 based upon a wireless network user subscription fee in all example embodiments and it should be understood that this feature is optional.

The mobile wireless communications device 12a, or devices 12a-12n, may each be a cellular telephone, smartphone, personal digital assistant (PDA), portable computer, or another suitable device. Of course, the mobile wireless communications devices 12a-12n may each be a different device. For clarity of explanation, only the single mobile wireless communications device 12a will be referred to hereinafter.

As discussed above, the wireless network 15 may include a cellular network and may employ at least one cellular protocol, such as Global System for Mobile Communications (GSM) or Code Division Multiple Access (CDMA). Those skilled in the art will understand that cellular protocols such as GSM and CDMA may enable the sending and receiving of SMS (Short Messaging Service) and MMS (Multimedia Messaging Service) messages and may provide connectivity with the Internet. The wireless network 15 may additionally or alternatively include a wireless data network employing a wireless protocol, such as Wi-Fi or WiMAX.

The processor 24 of the mobile wireless communications device 12a executes an advertising module 25 stored in the memory 23 that cooperates with the audio transducer 21 and the wireless transceiver 20 for recognizing keywords in voice communications. The advertising module 25 executes a voice recognition routine, as known to those of skill in the art, to analyze the voice communications and to recognize the keywords therein. The voice recognition routine may be a same routine that also provides the mobile wireless communications device 12a with voice activated dialing functionality.

It should be understood that voice communications include both incoming and outgoing voice communications between the mobile wireless communications device 12a and another mobile wireless communications device or land based telephone. Furthermore, voice communications include voice notes saved on the memory 23 of the mobile wireless communications device 12a and video recorded by and saved on the memory. In addition, voice communications include video files downloaded from another mobile wireless communications device or the Internet to the memory 23 of the mobile wireless communications device 12a.

Keywords are one or more words indicating a product or service in which a user may be interested in purchasing. For example, "pizza," "wine," or "movie rental" might be key words. If the keywords include a plurality of words, these words need not be sequential. The list of keywords may be stored in the memory 23 of the mobile wireless communications device 12a, may be stored on a memory 19 of the advertising server 17 (discussed below), or may be stored on both the mobile wireless communications device and the advertising server. If the list of keywords is stored in the memory 23 of the mobile wireless communications device 12a, that list may be periodically or aperiodically updated via a communication between the mobile wireless communications device and the advertising server 17.

The advertising server 17 includes a processor 18 and a memory 19 coupled thereto. The advertising server 17 may communicate wirelessly with the wireless network 15 or, alternatively, may communicate with a wired node of the wireless network. The advertising server 17 sends advertisement messages to the mobile wireless communications device 12a based upon the keywords. In some example embodiments, the advertising server 17 sends the advertisement messages to the mobile wireless communications device 12a in exchange for a discount of the user subscription fee to the wireless network 15. This discount may entice users to agree to have the advertisement messages presented.

The user subscription fee may be, for example, a monthly subscription fee, a yearly subscription fee, or a subscription fee based upon a number of minutes of access to the wireless network 15. The discount of the user subscription fee may be, for example, a discount of the entire subscription fee, or a discount of part of the subscription fee. Alternatively, other user subscription fee structures or discount structures may be employed.

The advertising module 25 may send one or more keywords to the advertising server 17 as they are recognized, or may store a recognized keyword list in the memory 23 to be sent to the advertising server at a later time.

The advertising module 25 may visually present received advertisement messages on the display and may present a given received advertising message during an associated voice communication. FIG. 1 illustrates the mobile communications system 10 operating in this fashion. In FIG. 1, the mobile wireless communications device 12a is engaged in voice communications via the wireless network 15. Playing through the audio transducer 21 is a snippet of a conversation which says "I'll come over at 7 pm tonight and we'll order a pizza." "Pizza" is a keyword in this example and has been recognized by the processor 24 of the mobile wireless communications device 12a as such. The advertising server 17 has sent an advertising message based upon the keyword "pizza" to the mobile wireless communications device 12a, and the processor 24 has displayed the advertising message on the display 13 during the voice communication associated with the keyword. The advertising message is illustratively for the user to "Try XYZ Pizza!" (and thus based upon the keyword "pizza.") Additionally or alternatively, the processor 24 may audibly present received advertisement messages via the audio transducer 21.

Of course, in some applications, such a visual advertisement message may include, for example, a phone number, an address, a website address, or any kind of visual content that the advertiser chooses to include. The visual content may be "active" in that a user may interact with the visual content in order to initiate an action of some kind. The user may be able to interact with a phone number in order to place a phone call to that phone number, with an address in order to display a map corresponding to that address, or with a website address in order to view that website. Other types of user interaction with the visual contact are also possible.

Those of skill in the art will appreciate that the advertisement message may cause the mobile wireless communications device 12a to launch an application. For example, the advertisement message may include a video file and may cause the mobile wireless communications device 12a to launch a video viewing application to view the video. As another example, the advertisement message may include a web page or a link thereto and may cause the mobile wireless communications device 12a to launch a web browser to view the web page.

Rather than presenting advertisement messages as they are received, a database module 26 may be stored in the memory 23 and executed by the processor 24 to store received advertisement messages in the memory 23 for presentation at a later point in time, such as after an associated voice communication. FIGS. 2A and 2B illustrate this feature. In FIG. 2A, the mobile wireless communications device 12a is engaged in voice communications via the wireless network 15. Playing through the audio transducer 21 is a snippet of a conversation which says "I'll come over at 7 pm tonight and we'll order a pizza." "Pizza" is a keyword in this example and has been recognized by the processor 24 of the mobile wireless communications device 12a as such.

The advertising server 17 has sent an advertisement message based upon the keyword "pizza" to the mobile wireless communications device 12a and the processor 24 has stored the advertisement message in the memory 23. In FIG. 2B, the mobile wireless communications device 12a is no longer engaged in voice communications and is instead audibly presenting the advertisement message via the audio transducer 21. The audible advertisement message is illustratively "Why not order from XYZ pizza tonight? We have the best pizza in town! Call us at 444-444-4444 to place your order now!" This may advantageously prompt the user to order from XYZ pizza.

The advertising server 17 and the mobile wireless communications device 12a may further cooperate to generate an advertisement message history. The advertising server 17 may selectively send the advertisement messages based upon the advertisement message history associated with the mobile wireless communications device 12a. This feature may prevent a user from to the same audio advertisement multiple times in a row. Additionally or alternatively, this may help ensure that the user listens to the same audio advertisement a desired number of times. Of course, the discount of the wireless network user subscription fee may be based upon the number of audio advertisements that the user has listened to. Of course, the advertisement message history need not be kept in all applications and it should be understood that this feature is optional.

In the illustrated example embodiment (FIG. 3), a database module 26 of the mobile wireless communications device 12a generates the advertisement message history and stores the advertisement message history in the memory 23. The database module 26 may then transfer that history to the advertising server 17 immediately after generation or at a later time. This would allow the advertisement message history to be accurately recorded even if the mobile wireless communications device 12a is not in communication with the wireless network 15 during presentation of the advertisement messages.

In other applications, the processor 18 of the advertising server 17 may generate and store the advertisement message history in its memory 19. In such an application, the advertising server 17 may transfer the advertisement message history to the mobile wireless communications device 12a. Further, in some applications, both the advertising server 17 and the at least one mobile wireless communications device 12a may store the advertisement message history.

The mobile wireless communications device 12a may optionally allow a user to skip presentation of an advertisement message if desired. The processor 24 of the mobile wireless communications device 12a may display a prompt on the display 13 asking a user if he or she would like to skip presentation of the advertisement message and the mobile wireless communications device may accept an input via a keypad 22 or other input device. The mobile wireless communications device 12a may skip presentation of the advertisement message based upon that input. This feature allows a user to presentation of an advertisement message that he or she is not interested in. Alternatively, the mobile wireless communications device 12a may not explicitly prompt the user to skip an advertisement message, but the user may instead use a particular input (for example, the keypad 22) to skip an advertisement message without being prompted.

A selected advertisement history may be stored in the memory 19 of the advertising server 17 or by the database module 26 of the mobile wireless communications device 12a. This history may indicate what advertisement messages that a user has viewed or listened to. Additionally or alternatively, this history may indicate what advertisement messages that the user has skipped. The advertising server 17 may selectively send the advertisement messages to the mobile wireless communications device 12a based upon this selected advertisement message history. For example, if this history indicates that a large percentage of advertisement messages for takeout pizza restaurants were skipped, the advertising server 17 may instead send advertisement messages for eat-in pizza restaurants.

Storage of the selected advertisement message history in both the memory 23 of the mobile wireless communications device 12a and the memory 19 of the advertising server 17 may facilitate a more complete history. For example, sometimes an advertisement message may be presented when the mobile wireless communications device 12a is not connected to the wireless network 15 (e.g. the user is on an airplane or in an area without wireless network coverage). If the mobile wireless communications device 12a stores a selected advertisement message history, a record of the advertisement messages selected during this time may not be lost. Once the mobile wireless communications device 12a reconnects to the wireless network 15, it may send its selected advertisement message history to the advertising server 17.

Since the above described features may allow for a user to skip presentation of the advertisement messages, it should be understood that the mobile wireless communications device 12a may alter the discount of the wireless network user subscription fee based upon the user section of advertisement messages or based upon the selected advertisement message history. For example, the discount may be decreased if a certain percentage of advertisement messages are skipped. Similarly, the discount may be increased if a certain percentage of the advertisement messages are not skipped.

Figure 4:
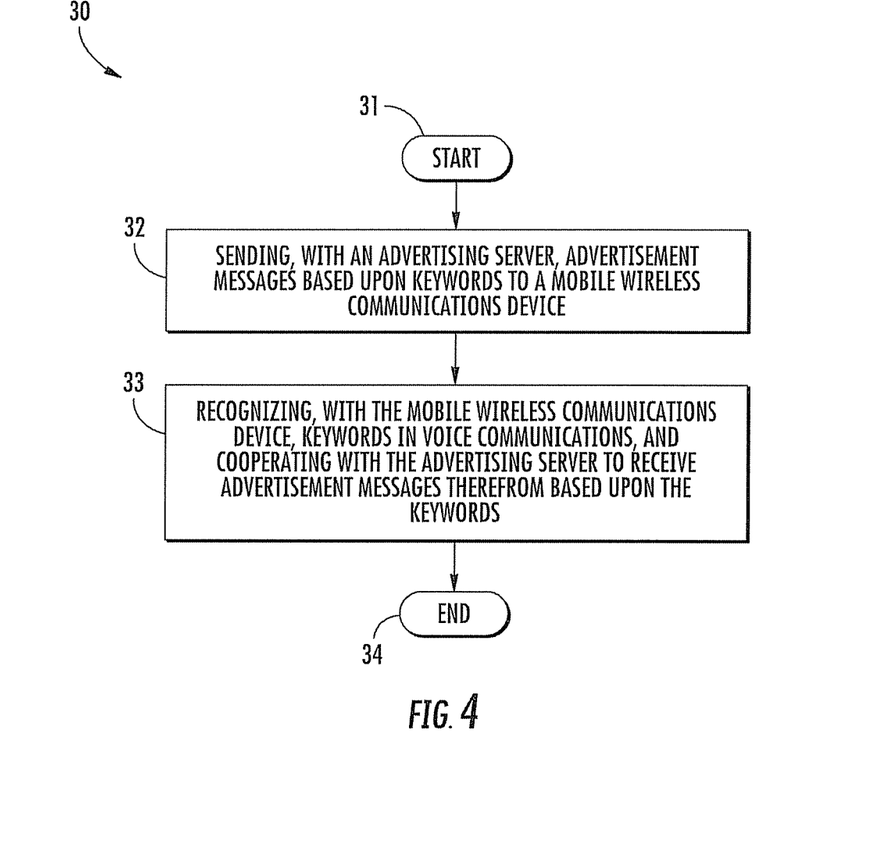
FIG. 4 is a flowchart of a method of operating a communications system in accordance with an example embodiment of the present disclosure.

Referring now to flowchart 30 of FIG. 4, a method of operating a communications system in accordance with the present disclosure is now described. After the start (Block 31), at Block 32, advertisement messages based upon keywords are sent, with an advertising server, to a mobile wireless communications device.

At Block 33, keywords in voice communications are recognized with the mobile wireless communications device, which cooperates with the advertising server to receive advertisement messages therefrom based upon the keywords. Block 34 indicates the end of the method.

Figure 5:
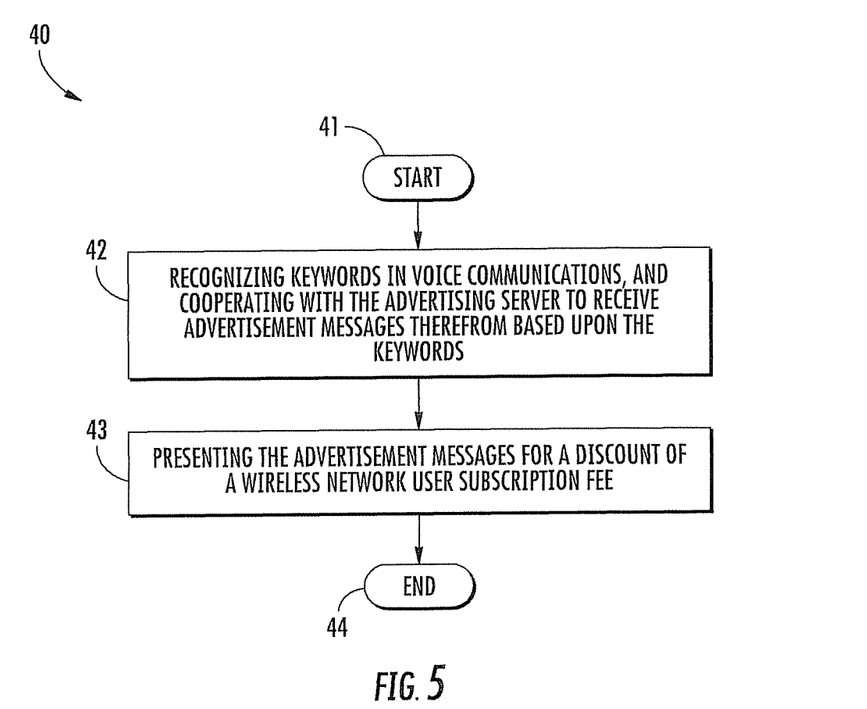
FIG. 5 is a flowchart of a method of operating a mobile wireless communications device in accordance with an example embodiment of the present disclosure.

Referring now to flowchart 40 of FIG. 5, a method of using a mobile wireless communications device operable based upon payment of a wireless network user subscription fee to receive advertisement messages based upon keywords from an advertising server is now described. After the start (Block 41), at Block 42, keywords are recognized in voice communications and the mobile wireless communications device cooperates with the advertising server to receive advertisement messages therefrom based upon the key words.

At Block 43, the advertisement messages are presented on a display for a discount of the wireless network user subscription free. Block 44 indicates the end of the method.

Exemplary components of a hand-held mobile wireless communications device 1000 that may be used in accordance with the communications system 10 are further described in the example below with reference to FIG. 6. The device 1000 illustratively includes a housing 1200, a keypad 1400 and an output device 1600. The output device shown is a display 1600, which may include a full graphic LCD. In some example embodiments, display 1600 may include a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some example embodiments, keypad 1400 may include a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 6:
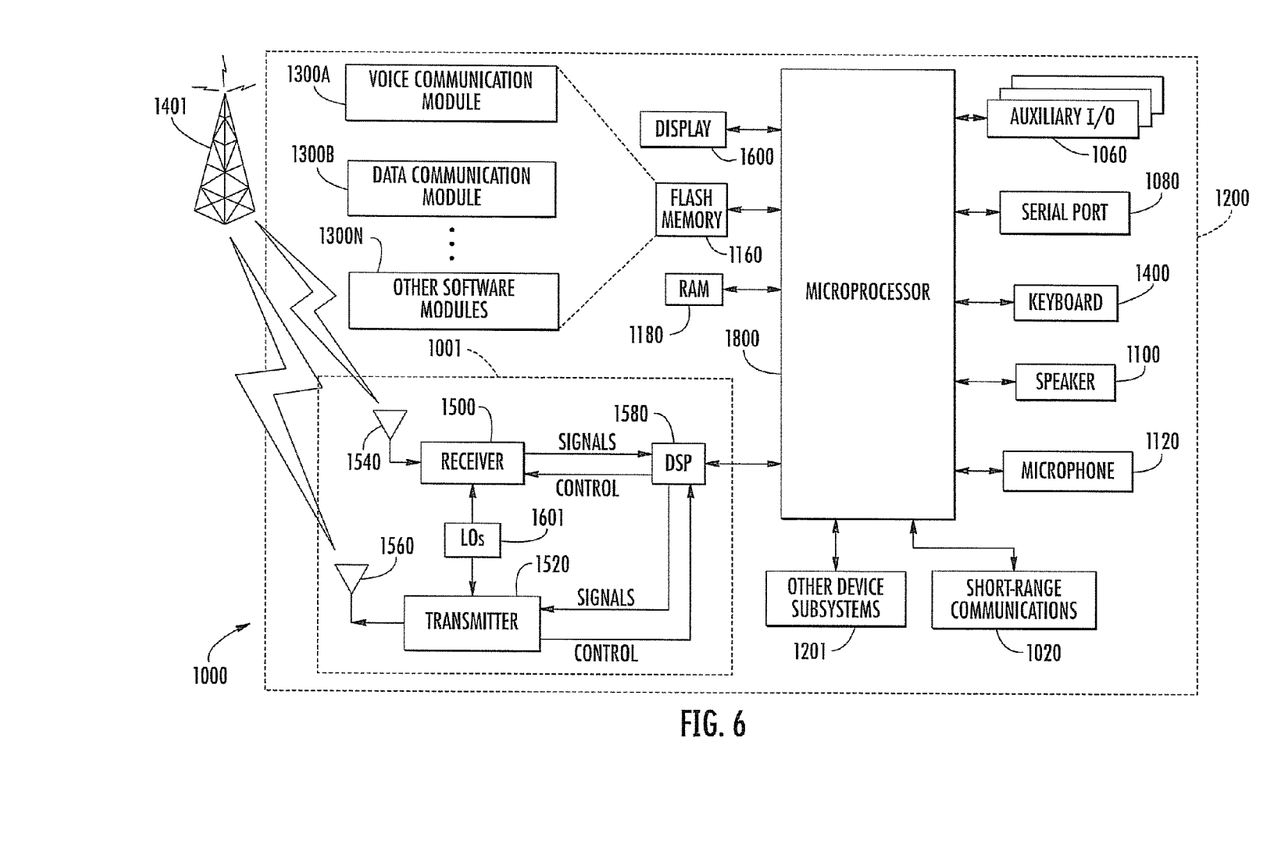
FIG. 6 is a schematic block diagram illustrating exemplary components of a mobile wireless communications device that may be used with the communications system of FIG. 1, according to an example embodiment.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices Many modifications and other example embodiments of the present disclosure will come to the mind of one skilled in the art having the benefit of the teachings presented in the foregoing descriptions and the associated drawings. Regarding the methods illustrated in the flowcharts of FIGS. 4 and 5, some of the steps illustrated may be performed in an order other than that which is described. Also, it should be appreciated that not all of the steps described in these flow diagrams are required to be performed, that additional steps may be added, and that some of the illustrated steps may be substituted with other steps. Therefore, it is understood that this disclosure is not to be limited to the specific example embodiments disclosed, and that modifications and example embodiments are intended to be included within the scope of the appended claims.

That which is claimed is:

1. A communications system comprising:
    an advertising server for sending advertisement messages for soliciting a purchase of at least one of products and services based upon keywords; and
    at least one mobile wireless communications device comprising
        a memory,
        at least one audio transducer,
        a wireless transceiver configured to perform wireless voice communications, and
        a processor cooperating with said at least one audio transducer and said wireless transceiver for recognizing keywords in the wireless voice communications, and cooperating with said advertising server to receive advertisement messages therefrom based upon the keywords;
    said processor of said at least one mobile wireless communications device also configured to
        store the received advertisement messages in the memory,
        present the received advertisement messages,
        generate an advertisement message history based upon whether the received advertisement messages have been skipped by a user, and
        send the advertisement message history to said advertising server;
    said advertising server selectively sending a given advertisement message based upon the received advertisement message history.

2. The communications system of claim 1 wherein said at least one mobile wireless communications device further comprises a display; and wherein said processor visually presents received advertisement messages on said display.

3. The communications system of claim 1 wherein said processor audibly presents received advertisement messages via said at least one audio transducer.

4. The communications system of claim 1 wherein said processor presents a given received advertising message during an associated voice communication.

5. The communications system of claim 1 wherein said at least one mobile wireless communications device further comprises at least one input device cooperating with said processor to permit user selection of presentation of a given received advertising message.

6. The communications system of claim 1 wherein said processor presents a given stored received advertising message after an associated voice communication.

7. A mobile wireless communications device to receive advertisement messages for soliciting a purchase of at least one of products and services based upon keywords from an advertising server comprising:
    a memory;
    at least one audio transducer;
    a wireless transceiver configured to perform wireless voice communications; and
    a processor cooperating with said at least one audio transducer and said wireless transceiver for recognizing keywords in the wireless voice communications, and cooperating with the advertising server to receive advertisement messages therefrom based upon the keywords;
    said processor of said at least one mobile wireless communications device also configured to
        store the received advertisement messages in the memory,
        present the received advertisement messages,
        generate an advertisement message history based upon whether the received advertisement messages have been skipped by a user, and
        send the advertisement message history to said advertising server;
    said advertising server selectively sending a given advertisement message based upon the received advertisement message history.

8. The mobile wireless communications device of claim 7 wherein said at least one mobile wireless communications device further comprises a display; and wherein said processor visually presents received advertisement messages on said display.

9. The mobile wireless communications device of claim 7 wherein said processor presents a given received advertising message during an associated voice communication.

10. The mobile wireless communications device of claim 7 wherein said processor presents a given stored received advertising message after an associated voice communication.

11. A method of operating a communications system comprising:
sending, with an advertising server, advertisement messages for soliciting a purchase of at least one of products and services based upon keywords to at least one mobile wireless communications device;
recognizing, with the at least one mobile wireless communications device, keywords in wireless voice communications, and cooperating with the advertising server to receive advertisement messages therefrom based upon the keywords;
storing the received advertisement messages in a memory of the at least one mobile wireless communications device;
presenting the received advertisement messages using the at least one mobile wireless communications device;
generating an advertisement message history based upon whether the received advertisement messages have been skipped by a user using the at least one mobile wireless communications device;
sending the advertisement message history to the advertising server using the at least one mobile wireless communications device; and
the advertising server selectively sending a given advertisement message based upon the received advertisement message history.

12. The method of claim 11 further comprising
operating the at least one mobile wireless communications device based upon payment of a wireless network user subscription fee; and
presenting, with the at least one mobile wireless communications device, the advertisement messages for a discount of the wireless network user subscription fee.

13. The method of claim 12 further comprising receiving, via an input device of the at least one mobile wireless communications device, user selection of presentation of a given received advertising message and altering the discount of the wireless network user subscription fee based upon the selection.

14. The method of claim 11 further comprising visually presenting received advertisement messages on a display of the at least one mobile wireless communications device.

15. The method of claim 11 further comprising audibly presenting advertisement messages via an audio transducer of the at least one mobile wireless communications device.

16. The method of claim 11 further comprising presenting a given received advertising message during an associated voice communication.

17. The method of claim 11 further comprising presenting a given stored received advertising message after an associated voice communication.

18. A method of using at least one mobile wireless communications device configured based upon payment of a wireless network user subscription fee to receive advertisement messages for soliciting a purchase of at least one of products and services based upon keywords from an advertising server comprising:
recognizing keywords in wireless voice communications, and cooperating with the advertising server to receive the advertisement messages therefrom based upon the keywords;
storing the received advertisement messages in a memory of the at least one mobile wireless communications device;
presenting the advertisement messages on a display of the at least one mobile wireless communications device for a discount of the wireless network user subscription fee;
generating an advertisement message history based upon whether the received advertisement messages have been skipped by a user using the at least one mobile wireless communications device; and
sending the advertisement message history to the advertising server using the at least one mobile wireless communications device;
a given advertisement message to be selectively sent by the advertising server based upon the received advertisement message history.

19. The method of claim 18 further comprising receiving, via an input device, user selection of presentation of a given received advertising message and altering the discount of the wireless network user subscription fee based upon the selection.

20. The method of claim 18 further comprising presenting a given stored received advertising message after an associated voice communication.

* * * * *